(12) United States Patent
Ren et al.

(10) Patent No.: US 10,999,400 B2
(45) Date of Patent: May 4, 2021

(54) APPLICATION ENTITY RESOURCE CREATION AND REGISTRATION METHOD, COMMUNICATION NODE DEVICE AND TERMINAL DEVICE

(71) Applicant: BOE TECHNOLOGY GROUP CO., LTD., Beijing (CN)

(72) Inventors: Junyuan Ren, Beijing (CN); Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 237 days.

(21) Appl. No.: 16/095,445

(22) PCT Filed: Nov. 25, 2016

(86) PCT No.: PCT/CN2016/107268
§ 371 (c)(1),
(2) Date: Oct. 22, 2018

(87) PCT Pub. No.: WO2017/185731
PCT Pub. Date: Nov. 2, 2017

(65) Prior Publication Data
US 2019/0149632 A1    May 16, 2019

(30) Foreign Application Priority Data

Apr. 26, 2016  (CN) .......................... 201610265886.1

(51) Int. Cl.
*G06F 15/173* (2006.01)
*H04L 29/08* (2006.01)
(Continued)

(52) U.S. Cl.
CPC .............. *H04L 67/32* (2013.01); *H04L 29/06* (2013.01); *H04W 60/04* (2013.01)

(58) Field of Classification Search
CPC ......... H04L 67/32; H04L 29/06; H04W 60/04
See application file for complete search history.

(56) References Cited

U.S. PATENT DOCUMENTS

2013/0201954 A1   8/2013  Gao et al.
2013/0275595 A1   10/2013 Hansen
(Continued)

FOREIGN PATENT DOCUMENTS

CN       103155682 A    6/2013
CN       103220670 A    7/2013
(Continued)

OTHER PUBLICATIONS

International Search Report of PCT/CN2017/102250 in Chinese, dated Dec. 1, 2017, with English translation.
(Continued)

*Primary Examiner* — Philip B Tran
(74) *Attorney, Agent, or Firm* — Collard & Roe, P.C.

(57) ABSTRACT

A method for creating a resource for an application entity, a method for registering an application entity, a communication node device, and a terminal device, the method for creating a resource for an application entity includes: receiving a registration request sent by the application entity when the application entity is switched from a first communication link to a second communication link; creating a resource as a first resource on the basis of the registration request; assigning an identifier corresponding to the first resource to the application entity, such that the application entity is associated with the first resource.

18 Claims, 11 Drawing Sheets

(51) Int. Cl.
*H04L 29/06* (2006.01)
*H04W 60/04* (2009.01)

(56) References Cited

U.S. PATENT DOCUMENTS

| | | | |
|---|---|---|---|
| 2014/0351403 A1 | 11/2014 | Lin et al. | |
| 2015/0023219 A1 | 1/2015 | Jin et al. | |
| 2016/0007138 A1* | 1/2016 | Palanisamy | H04W 4/70 455/41.2 |
| 2016/0088420 A1* | 3/2016 | Kim | H04W 4/70 370/328 |
| 2016/0366028 A1* | 12/2016 | Yin | H04L 41/20 |
| 2017/0054519 A1 | 2/2017 | Wu | |
| 2017/0238273 A1* | 8/2017 | Yang | H04W 4/70 455/435.1 |
| 2017/0251051 A1 | 8/2017 | Yin et al. | |
| 2017/0302617 A1* | 10/2017 | Wu | H04W 4/00 |
| 2018/0146497 A1* | 5/2018 | Jeong | H04W 4/70 |

FOREIGN PATENT DOCUMENTS

| | | |
|---|---|---|
| CN | 104601561 A | 5/2015 |
| CN | 105101040 A | 11/2015 |
| CN | 105491507 A | 4/2016 |
| CN | 105653374 A | 6/2016 |
| EP | 3 101 965 A1 | 12/2016 |
| EP | 3 197 183 A1 | 7/2017 |
| WO | 2015/120480 A1 | 8/2015 |
| WO | 2015/143086 A1 | 9/2015 |

OTHER PUBLICATIONS

Notice of Transmittal of the International Search Report of PCT/CN2017/102250 in Chinese, dated Dec. 1, 2017.
Written Opinion of the International Searching Authority of PCT/CN2017/102250 in Chinese, dated Dec. 1, 2017 with English translation.
International Search Report of PCT/CN2016/107268 in Chinese, dated Mar. 3, 2017, with English translation.
Notice of Transmittal of the International Search Report of PCT/CN2016/107268 in Chinese, dated Mar. 3, 2017.
International Preliminary Report on Patentability of PCT/CN2016/107268, dated Oct. 30, 2018 and Written Opinion of the International Searching Authority of PCT/CN2016/107268 in Chinese, dated Mar. 3, 2017 with English translation.
English translation of Extended European Search Report in EP Application No. 17880076.9 dated Jun. 16, 2020.
U.S. Non-Final Office Action in U.S. Appl. No. 16/466,830, dated Aug. 6, 2020.
Non-Final Office Action in U.S. Appl. No. 16/466,830 dated Mar. 15, 2021.

* cited by examiner

APPLICATION ENTITY RESOURCE CREATION AND REGISTRATION METHOD, COMMUNICATION NODE DEVICE AND TERMINAL DEVICE

CROSS REFERENCE TO RELATED APPLICATIONS

This application is the National Stage of PCT/CN2016/107268 filed on Nov. 25, 2016, which claims priority under 35 U.S.C. § 119 of Chinese Application No. 201610265886.1 filed on Apr. 26, 2016, the disclosure of which is incorporated by reference.

TECHNICAL FIELD

The present disclosure relates to the field of communication, and, more particularly, to a method of creating a resource for an application entity, a method for registering with an application entity, a communication node device, and a terminal device.

BACKGROUND

IOT (shortened from Internet of Things) technology used to realize informationization, remote management control, and network intelligence gradually grows up, along with the development of information technology, especially Internet technology. IOT connects sensors, controllers, machines, humans, and things together in new ways by using a local area network or Internet or other communication technology to form association between humans and things, and association between things and things. IOT is an extension of Internet, which encompasses Internet and all the resources on Internet, offer compatibility to all applications on Internet. As IOT technology develops, respective applied fields of IOT technology expand rapidly, many private protocols emerge, which hinders the development of IOT technology.

SUMMARY

The present disclosure provides a method of creating a resource for an application entity, a method for registering an application entity, a communication node device, and a terminal device, which can ensure continuity and reliability of the communication service when the communication link is switched.

An aspect of the present disclosure provides a method for creating a resource for an application entity, the method comprising:

receiving a registration request sent from the application entity when the application entity is switched from a first communication link to a second communication link;

creating a resource as a first resource according to the registration request; and assigning an identification corresponding to the first resource to the application entity so as to associate the application entity with the first resource.

An aspect of the present disclosure provides a method for registration of an application entity, comprising:

sending a registration request to create a resource as a first resource when the application entity is switched from a first communication link to a second communication link; and associating the application entity with the first resource based on an identification corresponding to the created first resource.

An aspect of the present disclosure provides a communication node device, comprising:

a receiving portion for receiving a registration request sent from an application entity communicating with the communication node device when the application entity is switched from a first communication link to a second communication link;

a processing portion for creating a resource according to the registration request as a first resource, assigning an identification corresponding to the first resource to the application entity to associate the application entity with the first resource; and a sending portion for sending a response indicating a completion of the resource creation to the application entity.

An aspect of the present disclosure provides a terminal device, comprising:

a sending portion for sending a registration request to a communication node device to create a resource as a first resource when an application entity running on the terminal device is switched from a first communication link to a second communication link;

a receiving portion for receiving a response indicating a completion of the resource creation sent from the communication node device; and a processing portion for associating the application entity with the first resource based on the identification corresponding to the created first resource.

In the methods and devices provided in the embodiments of the present disclosure, when the communication link is switched, the terminal device can be re-registered with the communication node, which avoids communication service interruption due to the situation in which the terminal device cannot be re-registered with the communication node when the communication link is switched, and thereby ensures continuity and reliability of the communication service.

BRIEF DESCRIPTION OF THE DRAWINGS

The embodiments of the present disclosure will be described in combination with the drawings to explain the principles of the present disclosure. It should be understood that the elements illustrated in the drawings can be implemented in various forms of hardware, software or combinations thereof. Optionally, these elements are implemented in a combination of hardware and software on one or more appropriately programmed general-purpose computer devices.

DETAILED DESCRIPTION OF THE EMBODIMENTS

Hereinafter, the embodiments of the present disclosure will be described in combination with the drawings. In the following description, detailed descriptions of known functions and configurations can be omitted for clarity and conciseness. In addition, the following embodiments are intended to illustrate the present disclosure, not intended to limit the scope of the present disclosure. In fact, other implementations can be conceived by those skilled in the art based on the following embodiments of the present disclosure. It will thus be appreciated that those skilled in the art will be able to devise various arrangements that, although not explicitly described or illustrated herein, embody the principles of the present disclosure and are included within its spirit and scope.

Figure 1:
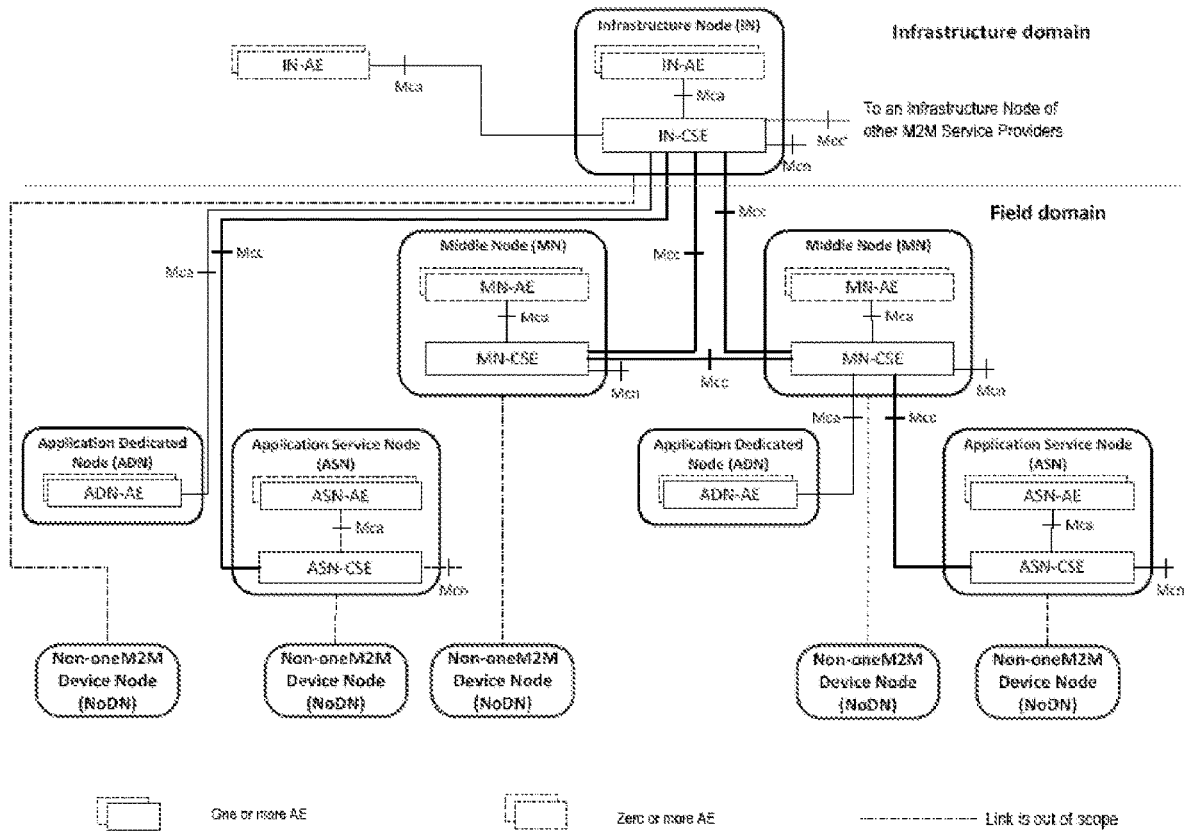
FIG. 1 is a schematic diagram of a functional architecture defined by the oneM2M protocol.

Four types of nodes, Application Dedicated Node (ADN), Application Service Node (ASN), Middle Node (MN), and Infrastructure Node (IN), are defined in the oneM2M protocol framework. As illustrated in FIG. 1, each node includes one or more entities, wherein the entity includes three types, Application Entity (AE), Common Service Entity (CSE), and Network Service Entity (NSE). AE uses service provided by CSE and needs to be registered with CSE, and rules of registration are as follows: one AE can be registered to at most one CSE, e.g. ASN-CSE, MN-CSE, or IN-CSE; one ASN-CSE can be registered to at most one other CSE, e.g. MN-CSE or IN-CSE; one MN-CSE can be registered to at most one other CSE, e.g. MN-CSE or IN-CSE. Registration relationship between entities is illustrated in Table 1 below.

| Originator (Registree) | Receiver (Registrar) | Registration Procedure |
| --- | --- | --- |
| ADN-AE | MN-CSE, IN-CSE | AE Registration Procedure |
| ASN-AE | ASN-CSE | |
| MN-AE | MN-CSE | |
| IN-AE | IN-CSE | |
| ASN-CSE | MN-CSE, IN-CSE | CSE Registration Procedure |

ADN is a terminal device, it contains at least one AE and no CSE, and it can use cloud service of IN in two modes:

(1) ADN-AE can be registered with MN-CSE first, and MN-CSE is registered with IN-CSE, so that ADN-AE uses the service provided by IN-CSE;

(2) ADN-AE can be registered directly with IN-CSE, so that ADN-AE uses the cloud service provided by IN-CSE.

Figure 2:
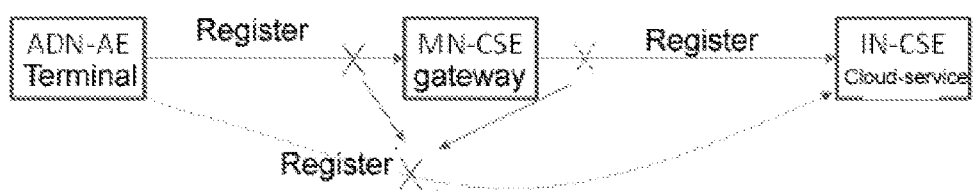
FIG. 2 schematically illustrates the situation where ADN-AE fails to be re-registered with IN-CSE when the communication link is switched.

With the development of technology, an ADN device can include more than one network interface. For example, one ADN can include two network interfaces, such as an Ethernet interface and a mobile network interface. As an example, the Ethernet interface of ADN performs data exchange with IN-CSE via a first communication link by using the above-described mode (1), and the mobile network interface of ADN performs data exchange with IN-CSE via a second communication link by using the above-described mode (2), wherein one communication link can be used as a backup. However, as illustrated in FIG. 2, if, for some reason, it needs to switch the communication link, for example, when the first communication link corresponding to the Ethernet interface is disconnected, that is, the first communication link having a connection to IN-CSE via MN-CSE which serves as a gateway is disconnected, in order to ensure continuity and reliability of communication, AE running on ADN should be automatically switched to the mobile network interface connected to the second communication link for direct connection to IN-CSE to continuously use the service provided by IN-CSE. However, according to provisions of the relevant protocol, one AE is registered with one CSE at most, e.g. ASN-CSE, MN-CSE, or IN-CSE. When ADN-AE is switched to the mobile network, ADN-AE cannot be re-registered with IN-CSE, because ADN-AE cannot delete a resource created on IN-CSE via MN-CSE, and thus communication service between AE and IN-CSE is disrupted, and there is no way to ensure communication reliability and quality. The principles of the present disclosure are explained below by taking the application entity ADN-AE in the application-specific node (ADN) and the common service entity IN-CSE in the infrastructure node (IN) under the M2M architecture as an example. It should be understood, however, that the principles of the present disclosure are not limited to this particular case. In practice, the principles of the present disclosure can also be implemented in the case in which other application entities AE and other common service entities CSE participate. For example, when the communication link is switched, ADN-AE can be switched from communicating with IN-CSE to communicating with the intermediate node MN-CSE without departing from the principles of the present disclosure.

Figure 3:
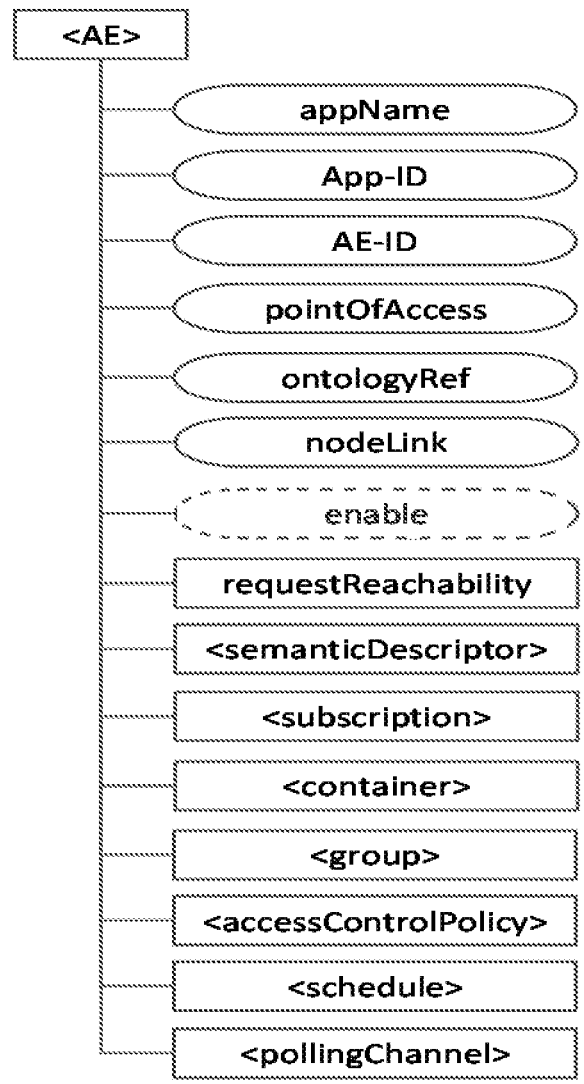
FIG. 3 illustrates modified resource information of AE according to an embodiment of the present disclosure.

In order to avoid communication interruption caused by AE's incapability of being re-registered with CSE when the communication link is switched under this protocol, according to an aspect of the present disclosure, as illustrated in FIG. 3, a resource for AE is added with an identification "enable" indicating availability of the source. In this way, when AE is re-registered, AE is allowed to be re-registered with CSE by resetting the identification indicating availability of the resource previously registered, thus ensuring successful switch of the communication link and continuity of the communication service. Specifically, when the identification "enable" is set (for example, it is set as "true"), it indicates that the resource corresponding to this identification is available; conversely, when the indication "enable" is reset (for example, it is reset as "false"), it indicates that the resource corresponding to this identification is unavailable.

The process of re-registering AE with CSE using the added resource availability identification "enable" according to an embodiment of the present disclosure will be described below in connection with FIG. 4.

According to the related protocol, when ADN-AE needs to get service from the communication node IN-CSE via MN-CSE which serves as a gateway, AE can send a request to an MN-CSE for creating AE resource on the MN-CSE via the first communication link MN-CSE. As illustrated in Steps 1 to 3 of FIG. 4, AE can send a request, e.g. Request (Create<AE> AE-ID='C'), to MN-CSE; after the authority of AE is verified, MN-CSE assigns an identifier AE-ID. e.g. C22222, to AE according to the request from AE and creates a resource, and then sends information on the created resource to the AE as a response, e.g. Response (Create<AE> AE-ID='C22222'). Such situation is suitable for a case in which MN-CSE automatically assigns an AE-ID to AE, for example, this mode can be adopted when AE is initially registered on MN-CSE. Alternatively, as illustrated in Step 1' to 3' of FIG. 4, AE can send a request in which AE-ID is specified, e.g. Request (Create<AE> AE-ID='C11111'), to MN-CSE; after authority of AE is verified, MN-CSE creates a resource using AE-ID specified by AE, e.g. C11111, according to the request from AE, and sends information on the created resource to AE as a response, e.g. Response (Create<AE> AE-ID='C11111'). This situation is suitable for a case in which the MN-CSE creates a resource using AE-ID specified by AE, for example, this mode can be adopted when AE is re-registered on MN-CSE.

According to the relevant protocol, when AE requests to create a resource by using the AE-ID beginning with the character C, it needs to ensure the unique of AE-ID within a range of CSE (the MN-CSE in this embodiment) with which AE is registered. For the AE to exchange data with IN-CSE via MN-CSE, it is also necessary to establish a communication link between MN-CSE and IN-CSE. According to the related protocol of oneM2M, MN-CSE sends a request, e.g. Request(Create <remoteCSE>), to IN-CSE. After authority of MN-CSE is verified, IN-CSE creates a corresponding resource Create<remoteCSE> according to the request from MN-CSE, and sends a request, e.g. Request(Create <remoteCSE>), to MN-CSE. MN-CSE creates a corresponding resource Create</CSEBase/remoteCSE> locally according to the request from IN-CSE, indicating resource information on IN-CSE.

Through the above process, a communication link via which the AE is linked to the communication node IN-CSE via MN-CSE which serves as a gateway is established so that AE can access, via MN-CSE, data and service provided on IN-CSE.

If the communication link is interrupted between AE and MN-CSE or the communication link between MN-CSE and IN-CSE for some reason, such as a fault, a power down or other abnormality, AE can be switched to another communication link directly connected to IN-CSE to ensure continuity of the communication service.

Figure 4:
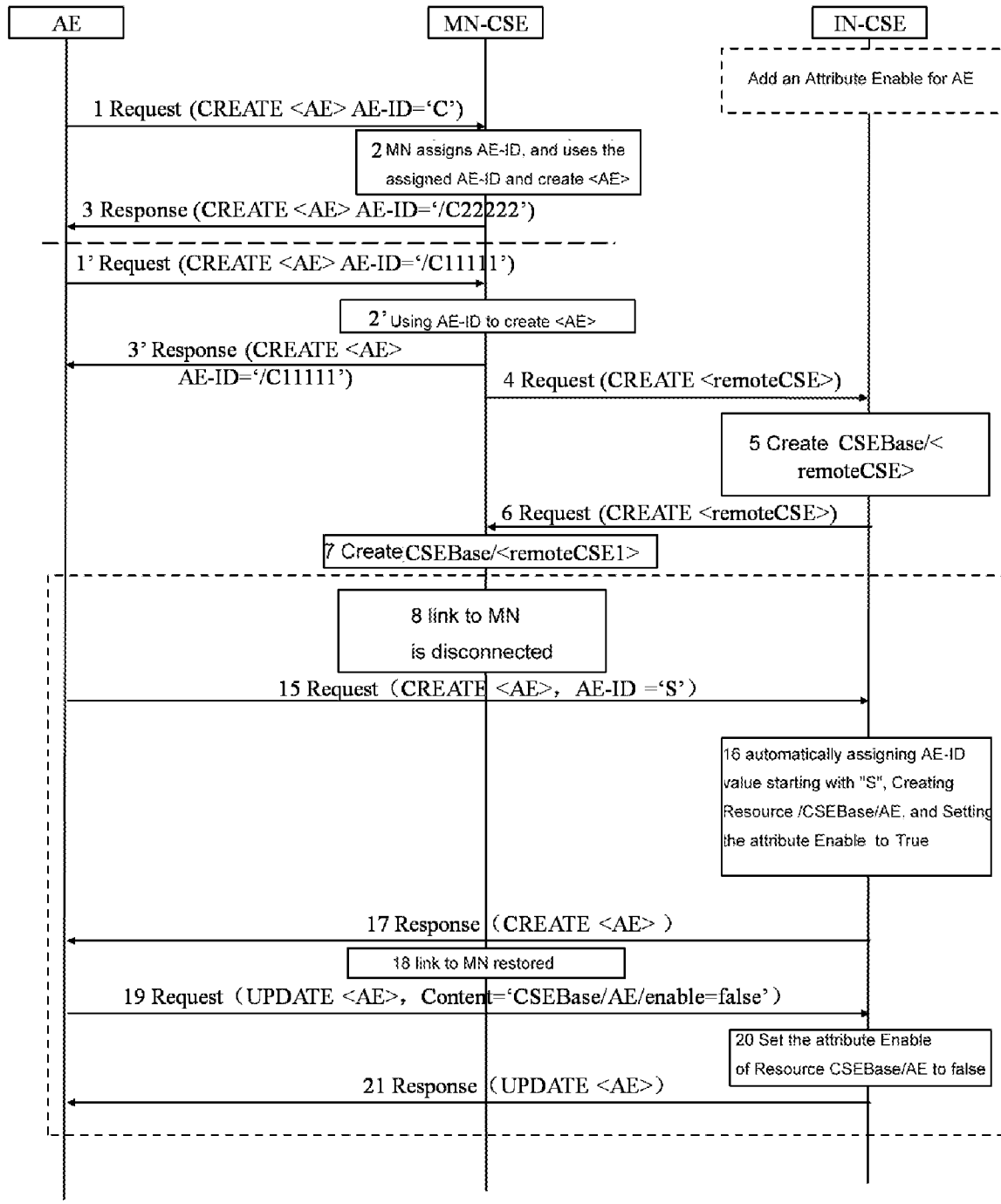
FIG. 4 schematically illustrates the process of creating a resource for an application entity (AE) when the communication link is switched according to an embodiment of the present disclosure.

To this end, according to an embodiment of the present disclosure, as illustrated in FIG. 4, upon it is detected that the communication link via MN is interrupted, AE sends a registration request, e.g. Request(Create<AE>, AE-ID='S'), to IN-CSE via the second communication link; after authority of AE is verified, IN-CSE automatically assigns an AE-ID value beginning with S, creates a/CSEBase/AE resource, sets its "enable" attribute as "true", and then sends information on the created resource to AE as a response, e.g. Response(Create<AE>), thus completing re-registration of AE with IN-CSE. According to the related protocol of oneM2M, when AE uses the AE-ID beginning with the character S to request creating a resource, it needs to ensure the unique of AE-ID within a service provider SP domain where IN-CSE is located.

Of course, different from the manner in which the IN-CSE specifies the AE-ID value for AE as described above, alternatively, IN-CSE can also create a corresponding resource for AE based on the AE-ID value specified by AE. For example, AE can send a request to IN-CSE, e.g. Request (Create <AE>, AE-ID='S33333') in which the AE-ID beginning with S is specified, for creating a resource to IN-CSE; after authority of AE is verified, IN-CSE creates a resource using the AE-ID specified by AE (e.g. S33333) according to the request from AE, and then sends information on the created resource to AE as a response, thus completing re-registration of AE.

By the above process, when AE is switched from the communication link connected to IN-CSE via MN-CSE to the communication link directly connected to IN-CSE, re-registration of AE on IN-CSE can be achieved, so that continuity of the communication traffic is ensured, and reliability of data service is improved.

Optionally, according to an embodiment of the present disclosure, when the communication link connected to IN-CSE via MN-CSE is restored, AE can also be switched from the communication link directly connected to IN-CSE to the recovered communication link connected to IN-CSE via MN-CSE. As illustrated in FIG. 4, in Steps 19 to 21, AE sends an update request, e.g. Request(Update<AE>, Content='CSEBase/AE/enable=false'), to IN-CSE, upon receiving the update request, IN-CSE changes the value of the availability identification "enable" of the resource CSE-Base/AE of the communication link directly connected to IN-CSE corresponding to AE as registered previously to "false", and then sends a response Response (Update <AE>) to AE, indicating that the update is successful. In this way, the identification indicating availability of the resource corresponding to the second communication link is reset to "false", indicating that the resource is unavailable. In other words, AE cannot access service and data provided on IN-CSE through the second communication link. However, on the first communication link AE---MN-CSE----IN-CSE communicating via MN-CSE to which it is switched back, AE can establish the corresponding resource by a registration request to access service and data on IN-CSE via MN-CSE.

A process of re-registering AE with CSE by using the added resource availability identification "enable" according to another embodiment of the present disclosure will be described below in connection with FIG. 5. Different than the case in which the AE uses the AE-ID beginning with the character C on the communication link connected to IN-CSE via MN-CSE in FIG. 4, FIG. 5 illustrates the case in which AE uses the AE-ID beginning with the character S on the communication link connected to IN-CSE via MN-CSE.

Figure 5:
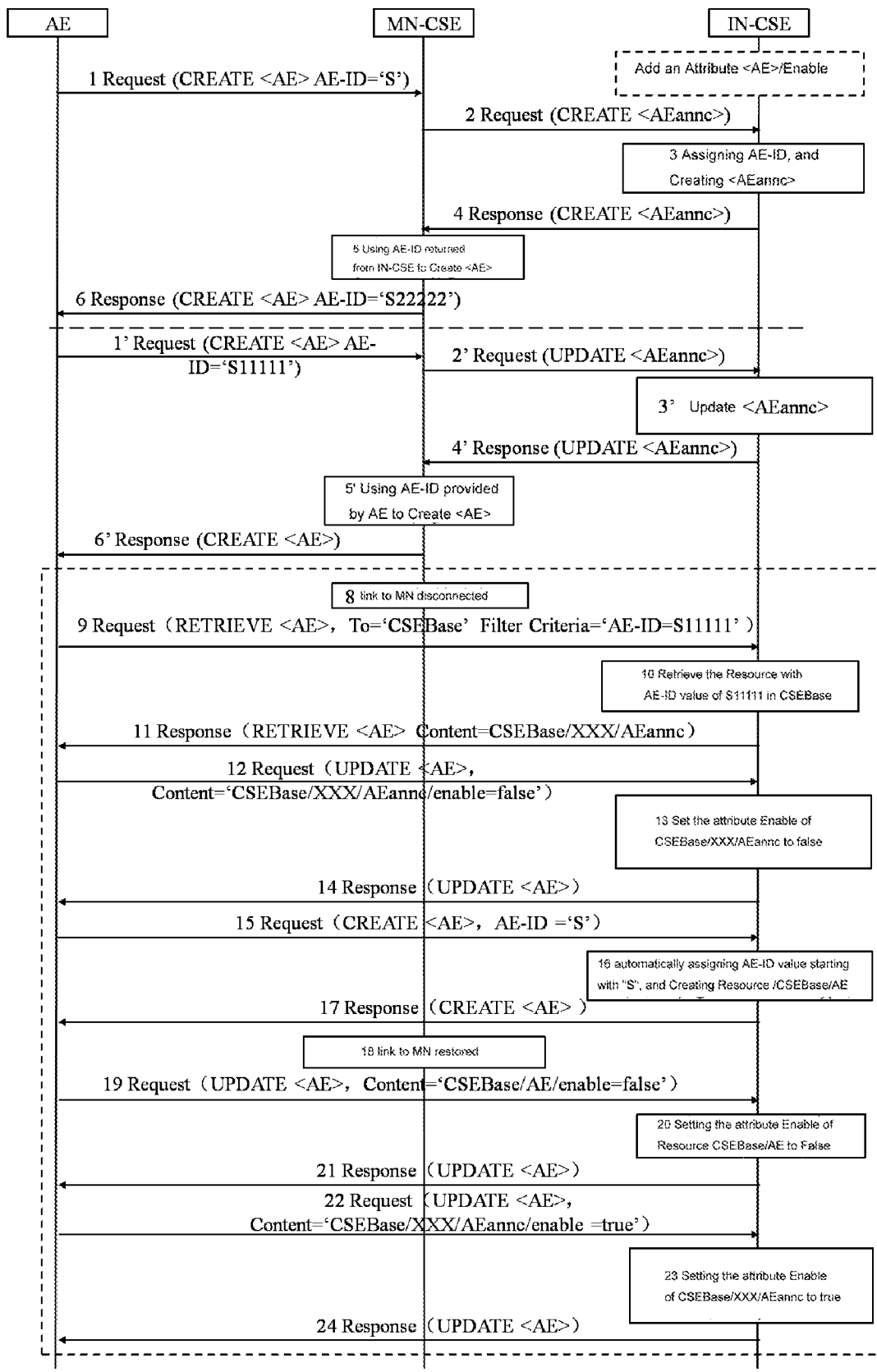
FIG. 5 schematically illustrates the process of creating a resource for AE when the communication link is switched according to another embodiment of the present disclosure.

As illustrated in Steps 1 to 6 of FIG. 5, AE can send a request for creating a AE resource, e.g. Request (Create<AE> AE-ID='S'), to MN-CSE via the first communication link when AE needs to get service from the communication node IN-CSE via MN-CSE, MN-CSE sends a request Request(Create<AEannc>) to IN-CSE according to the request from AE; IN-CSE authenticates this request, assigns an identifier AE-ID to AE, creates a resource, e.g. <AEannc>, and then sends information on the created resource to MN-CSE as a response, e.g. Response(Create <AEannc>); MN-CSE uses the AE-ID returned by IN-CSE, e.g. S22222, to create the resource <AE>, and returns a response of successful resource creation, Response (Create<AE> AE-ID='S22222'), to AE. This situation is suitable for the case in which the IN-CSE automatically assigns AE-ID to AE, for example, this mode can be adopted when AE is initially registered on IN-CSE. Alternatively, as illustrated in Steps 1' to 6' of FIG. 5, AE can send a request for creating a AE resource, e.g. Request(Create<AE> AE-ID='S11111') in which AE-ID is specified, to MN-CSE via the first communication link; MN-CSE sends a request, Request(Update<AEannc>), to IN-CSE according to the request from AE; IN-CSE validates the request, updates the resource <AEannc>, and then returns a response of successful update, e.g. Response(Update<AEannc>), to MN-CSE; MN-CSE uses the AE-ID specified by AE, e.g. S11111, to create the resource <AE>, and returns to AE a response of successful resource creation, Response (Create<AE>). This situation is suitable for the case in which IN-CSE creates a resource by using the AE-ID specified by AE, for example, this mode can be adopted when AE is re-registered on IN-CSE.

Through the above process, the communication link in which the AE is linked to IN-CSE via MN-CSE is established, so that AE can access, via MN-CSE, service and data provided by IN-CSE.

If the communication link between AE and MN-CSE or the communication link between MN-CSE and IN-CSE is interrupted for some reason, such as a fault, a power down or other abnormality, AE can be switched to another communication link directly connected to IN-CSE to ensure continuity of the communication service.

To this end, according to an embodiment of the present disclosure, as illustrated in FIG. 5, upon it is detected that the communication link communicating via MN is interrupted, AE sends a request for retrieving resource, e.g. Request (Retrieve<AE>, To='/CSEBase', Filter Criteria='AE-ID=S11111'), to IN-CSE via the second communication link so as to retrieve the resource previously registered and corresponding to AE on IN-CSE. Upon receipt of the registration request, IN-CSE retrieves the resource corresponding to AE locally; in particular, IN-CSE retrieves the resource having the same AE-ID value by using the identifier information AE-ID of AE as included in the registration request, and sends information on the resource of AE as registered previously to AE as a response, e.g. Response (Retrieve<AE>, Content='CSEBase/xxx/AEannc'). After the response sent from IN-CSE is received, AE sends an update request to IN-CSE, e.g. Request(Update<AE>, Content='CSEBase/xxx/AEannc/enable=false'), so as to modify the availability identification "enable" of the resource CSEBase/xxx/AEannc corresponding to AE as registered previously on IN-CSE to be "false". When the update request is received, IN-CSE modifies the availability identification "enable" of the resource CSEBase/xxx/AEannc corresponding to AE as registered previously on IN-CSE to be "false", and then sends a response Response (Update<AE>) to AE, indicating that the update is successful. Upon receipt of the response, AE sends a request for creating a resource, e.g. Request(Create<AE>, AE-ID='S'), to IN-CSE. After authority of AE is verified, IN-CSE automatically assigns an AE-ID value beginning with S to AE, creates the resource/CSEBase/AE, and then sends information on the created resource as a response to AE, e.g., Response(Create<AE>), thus completing re-registration of AE on IN-CSE. Of course, different than the case in which IN-CSE specifies the AE-ID value for AE as described above, alternatively, IN-CSE can also create a corresponding resource for AE based on the AE-ID value specified by AE. For example, AE can send a request for creating a resource, e.g. Request (Create <AE>, AE-ID='S33333') in which the AE-ID beginning with S is specified, to IN-CSE; after authority of AE is verified, IN-CSE creates a resource by using the AE-ID specified by AE (e.g., S33333) according to the request from AE, and then sends information on the created resource to AE as a response, thus completing re-registration of AE.

By the above process, when AE is switched from the first communication link connected to IN-CSE via MN-CSE to the second communication link directly connected to IN-CSE, re-registration of AE on IN-CSE can be achieved, so that continuity of the communication traffic is ensured, and reliability of data service is improved.

Optionally, according to an embodiment of the present disclosure, when the communication link connected to IN-CSE via MN-CSE is restored, AE can also be switched from the second communication link directly connected to IN-CSE to the recovered first communication link connected to IN-CSE via MN-CSE. As illustrated in FIG. 5, in Steps 19 to 21, AE sends an update request, e.g. Request (Update<AE>, Content='CSEBase/AE/enable=false'), to IN-CSE; upon receiving the update request, IN-CSE modifies the value of the availability identification "enable" of the resource CSEBase/AE of the communication link directly connected to the IN-CSE corresponding to the AE as registered previously to "false", and then sends a response Response (Update <AE>) to AE, indicating that the update is successful. When receiving this response, AE sends another update request, e.g. Request(Update<AE>, Content='CSEBase/xxx/AEannc/enable=true'), to IN-CSE, so as to modify the availability identification "enable" value of the resource CSEBase/xxx/AEannc of the communication link via MS-CSE corresponding to AE as previously registered on IN-CSE, into "true". When receiving this update request, IN-CSE modifies the availability identification "enable" value of the resource CSEBase/xxx/AEannc corresponding to AE as previously registered into "true", and thereafter sends a response Response(Update<AE>) to AE, indicating that the update is successful, so that AE can, by using the resource of the communication link of connecting to IN-CSE via MN-CSE as previously registered, utilize the restored MN-CSE link to access IN-CSE without repeating Steps 1 to 6 (or Steps 1' to 6') in FIG. 5 to re-establish the communication link.

According to another aspect of the present disclosure, different than the case in which the resource availability identification is added to the resource of the AE to ensure that AE is re-registered with CSE illustrated in FIGS. 4 and 5, re-registration of AE with CSE can also be achieved by deleting the resource information registered previously by AE on CSE. The process of re-registering AE with CSE by deleting the resource previously registered by AE according to embodiments of the present disclosure will be described below with reference to FIGS. 6 and 7.

Figure 6:
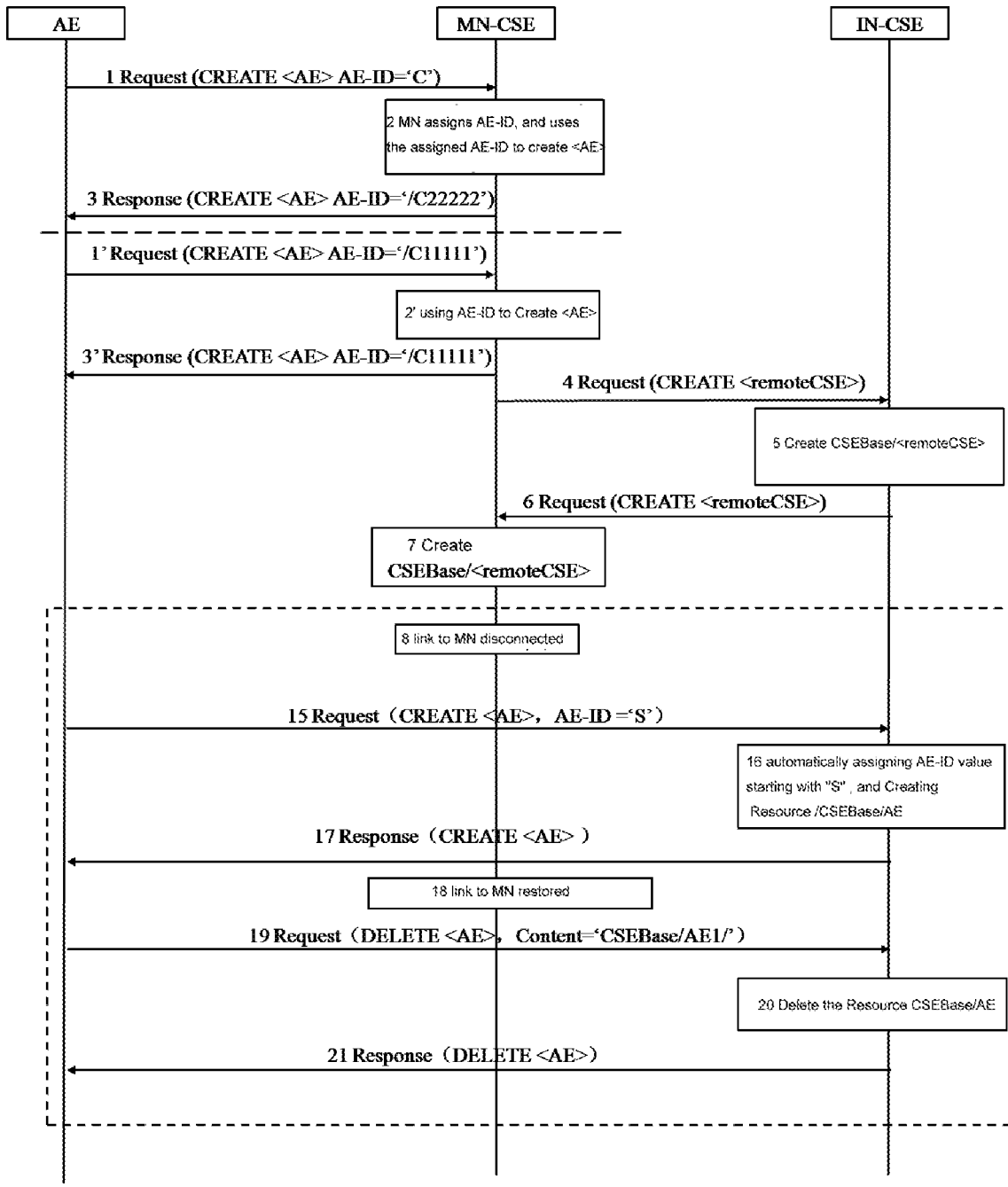
FIG. 6 schematically illustrates the process of creating a resource for AE when the communication link is switched according to yet another embodiment of the present disclosure.

Similar to FIG. 4, FIG. 6 illustrates the case that AE uses the AE-ID beginning with the character C on the communication link connected to IN-CSE via MN-CSE. The steps 1 to 3 (1' to 3') and 4 to 7 in FIG. 6 are similar to the corresponding steps in FIG. 4, schematically illustrating the process of registering AE on IN-CSE via MN-CSE, and the detailed descriptions are not repeated here.

Through the above process, the communication link in which the terminal device AE is linked to the communication node IN-CSE via MN-CSE which serves as a gateway is established, so that AE can exchange data and information with IN-CSE via MN-CSE.

If the communication link between AE and MN-CSE or the communication link between MN-CSE and IN-CSE is interrupted for some reason, such as a fault, a power failure or other abnormality, AE can be switched to another communication link directly connected to IN-CSE to ensure continuity of the communication service.

To this end, according to an embodiment of the present disclosure, as illustrated in FIG. 6, upon it is detected that the communication link via MN is interrupted, AE sends a resource creation request to IN-CSE, e.g. Request (Create<AE>, AE-ID='S'); after authority of AE is verified, IN-CSE automatically assigns an AE-ID value beginning with S and creates a/CSEBase/AE resource, and then sends information on the created resource to AE as a response, e.g. Response (Create<AE>), thus completing re-registration of AE on IN-CSE. According to the related protocol, when AE uses the AE-ID request beginning with the character S to create a resource, it needs to ensure the unique of AE-ID within a service provider SP domain where IN-CSE is located.

Of course, as stated above, different than the case in which IN-CSE specifies the AE-ID value for AE as described above, alternatively, IN-CSE can also create a corresponding resource for AE based on the AE-ID value specified by AE. For example, AE can send a request for creating a resource, e.g. Request (Create<AE>, AE-ID='S33333') in which the AE-ID beginning with S is specified, to IN-CSE; after authority of AE is verified, IN-CSE creates a resource using the AE-ID specified by AE (e.g. S33333) according to the request from AE, and then sends information on the created resource to AE as a response, thus completing re-registration of AE.

By the above process, when AE is switched from the communication link connected to IN-CSE via MN-CSE to the communication link directly connected to IN-CSE, re-registration of AE on IN-CSE can be achieved, so that continuity of the communication traffic is ensured, and reliability of data service is improved.

Optionally, according to an embodiment of the present disclosure, when the communication link connected to IN-CSE via MN-CSE is restored, AE can also be switched from the communication link directly connected to IN-CSE to the recovered communication link connected to IN-CSE via MN-CSE. As illustrated in FIG. 6, in Steps 19 to 21, AE sends a deletion request to IN-CSE, e.g. Request (Delete<AE>, Content='CSEBase/AE'); upon receiving the deletion request, IN-CSE deletes the resource CSEBase/AE of the communication link directly connected to IN-CSE corresponding to AE as registered previously, and then sends a response Response (Update<AE>) to AE, indicating that the deletion is successful. When this response is received, AE can use the restored first communication link to access service and data on IN-CSE via MN-CSE.

Figure 7:
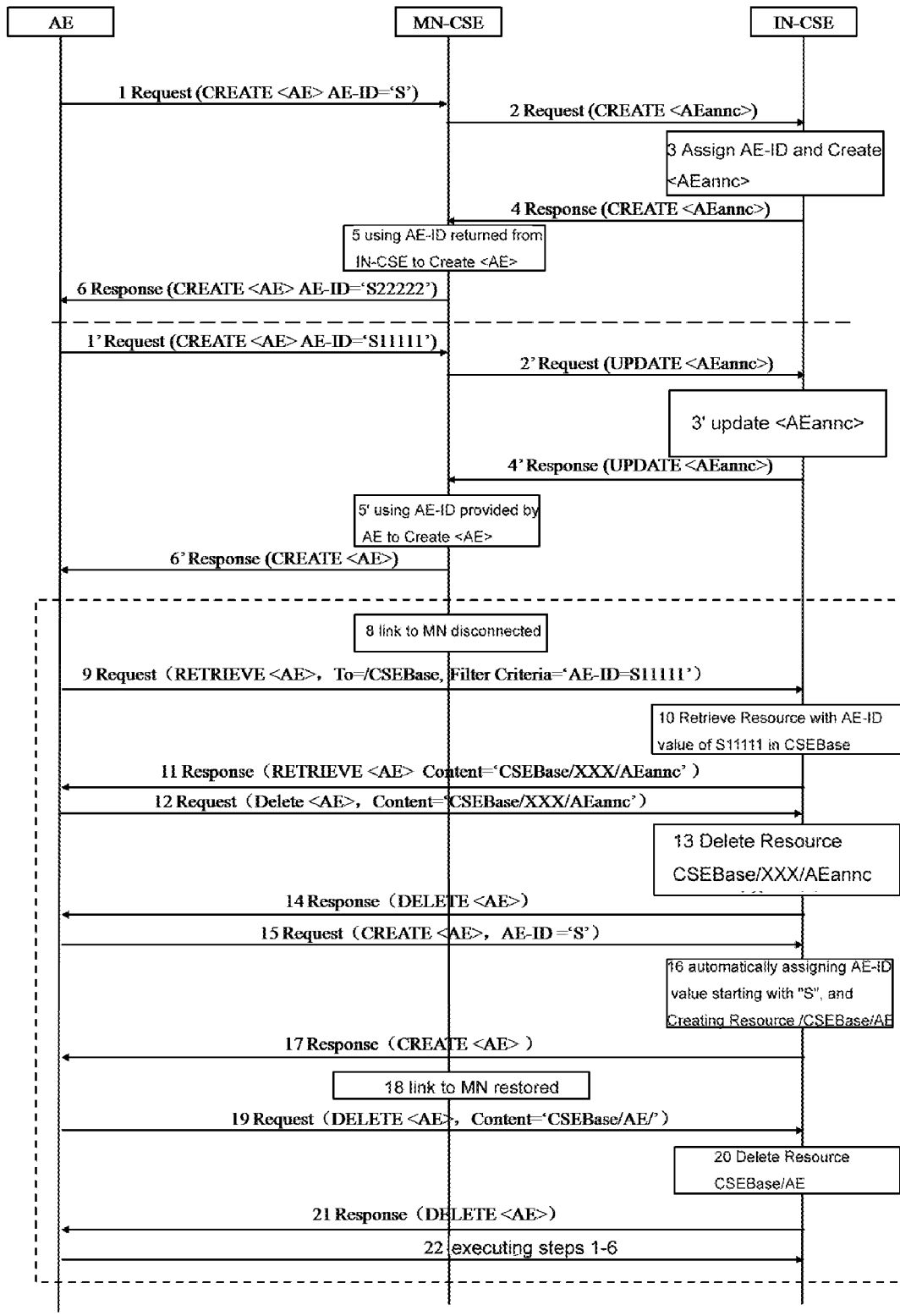
FIG. 7 schematically illustrates the process of creating a resource for AE when the communication link is switched according to another embodiment of the present disclosure.

In contrast to FIG. 6, FIG. 7 illustrates the case in which AE uses an AE-ID beginning with the character S on the communication link connected to IN-CSE via MN-CSE. The Steps 1 to 6 (1' to 6') in FIG. 7 are similar to the corresponding steps in FIG. 5, schematically illustrating the process of registering AE on IN-CSE via MN-CSE, and the detailed descriptions are not repeated here.

By the above process, the communication link in which the terminal device AE is linked to the communication node IN-CSE via MN-CSE is established, so that AE can exchange data and information with IN-CSE via MN-CSE.

If the communication link between AE and MN-CSE or the communication link between MN-CSE and IN-CSE is interrupted for some reason, such as a fault, a power failure or other abnormality, AE can be switched to another communication link directly connected to IN-CSE to ensure continuity of the communication service.

To this end, according to an embodiment of the present disclosure, as illustrated in FIG. 7, upon it is detected that the communication link via MN is interrupted, AE sends a resource retrieving request, e.g. Request(Retrieve<AE>, To='/CSEBase', Filter Criteria='AE-ID=S11111'), to IN-CSE via the second communication link so as to retrieve the resource corresponding to AE as registered previously on IN-CSE; upon receipt of the registration request, IN-CSE retrieves the resource corresponding to AE locally, in particular, IN-CSE retrieves the resource having the same AE-ID value by using the identifier information AE-ID of AE as included in the registration request, and sends information on the resource of AE as registered previously to AE as a response, e.g., Response(Retrieve<AE>, Content='CSEBase/xxx/AEannc'). After the response sent from IN-CSE is received, AE sends a deletion request, e.g., Request(Delete<AE>, Content='CSEBase/xxx/AEannc'), to IN-CSE, so as to delete the resource CSEBase/xxx/AEannc corresponding to AE as registered previously on IN-CSE. When the deletion request is received, IN-CSE deletes the resource CSEBase/xxx/AEannc corresponding to AE as registered previously on IN-CSE, and thereafter sends a response Response(Delete<AE>) to AE, indicating that the deletion is successful. Steps 15 to 17 after receiving this response are similar to the corresponding steps in FIG. 6, that is, AE sends a request for creating a resource, e.g., Request(Create<AE>, AE-ID='S'), to IN-CSE. After authority of AE is verified, IN-CSE automatically assigns an AE-ID value beginning with S to AE, creates the resource/CSEBase/AE, and then sends information on the created resource as a response to AE, e.g., Response (Create<AE>), thus completing re-registration of AE on IN-CSE. Of course, different than the case in which IN-CSE specifies the AE-ID value for the AE as described above, alternatively, IN-CSE can also create a corresponding resource for AE based on the AE-ID value specified by AE. For example, AE can send a request for creating a resource, e.g., Request (Create <AE>, AE-ID='S33333') in which the AE-ID beginning with S is specified, to IN-CSE; after authority of AE is verified, IN-CSE creates a resource by using the AE-ID specified by AE (e.g., S33333) according to the request from AE, and then sends information on the created resource to AE information as a response, thus completing re-registration of AE.

By the above process, when AE is switched from the communication link connected to IN-CSE via MN-CSE to the communication link directly connected to IN-CSE, re-registration of AE on IN-CSE can be achieved, so that continuity of the communication traffic is ensured, and reliability of data service is improved.

Optionally, according to an embodiment of the present disclosure, when the first communication link connected to IN-CSE via MN-CSE is restored, AE can also be switched from the second communication link directly connected to IN-CSE to the recovered first communication link connected to IN-CSE via MN-CSE. As illustrated in FIG. 7, in Steps 19 to 21, AE sends a deletion request, e.g. Request (Delete<AE>, Content='CSEBase/AE'), to IN-CS; upon receiving the deletion request, IN-CSE deletes resource CSEBase/AE of AE corresponding to the second communication link directly connected to IN-CSE as registered previously, and then sends a response Response Response (Delete<AE>) to AE, indicating that the deletion is successful. When the response is received, it is necessary to repeat Steps 1 to 6 (or Step 1' to 6') to re-create the link resource corresponding to the link connected to IN-CSE via MN-CSE since the previously registered resource of AE corresponding to the link connected to IN-CSE via MN-CSE has been deleted.

Figure 8:
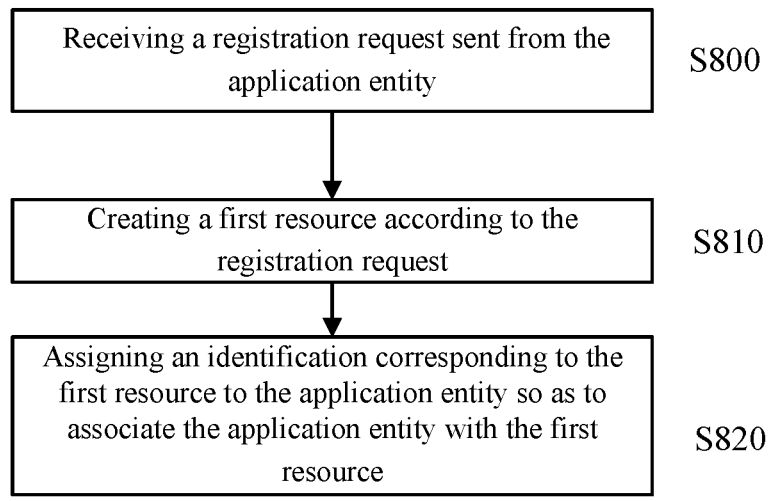
FIG. 8 illustrates a schematic flowchart of a method for creating a resource for an application entity according to an embodiment of the present disclosure.

FIG. 8 illustrates a schematic flowchart of a method for creating a resource for an application entity according to an embodiment of the present disclosure. As illustrated in FIG. 8, the method comprises the following steps: S800, receiving a registration request sent from the application entity on a second communication link when it is detected that the application entity is switched from a first communication link to the second communication link; S810, creating a first resource according to the registration request; and S820, assigning an identification corresponding to the first resource to the application entity so as to associate the application entity with the first resource.

Optionally, the first resource comprises a first attribute indicating availability of the first resource. The first attribute indicates availability of the first resource. For example, when the first attribute is set as false, it indicates that the first resource associated with the application entity is unavailable. Contrarily, if the first attribute is set as true, it indicates that the first resource associated with the application entity is available.

Optionally, the registration request comprises a start identifier instructing to create the first resource for the application entity. For example, a letter T can be used in the register request to indicate that a first recourse is to be created for the application entity.

Optionally, the first resource can be temporal. In other words, when the application entity is switched from the second communication link back to the first communication link, the first resource can be deleted.

Optionally, the first attribute can be set when creating the first resource to indicate that the first resource is available.

Optionally, the first attribute can be reset when being switched from the second communication link back to the first communication link to indicate that the first resource is unavailable.

Figure 9:
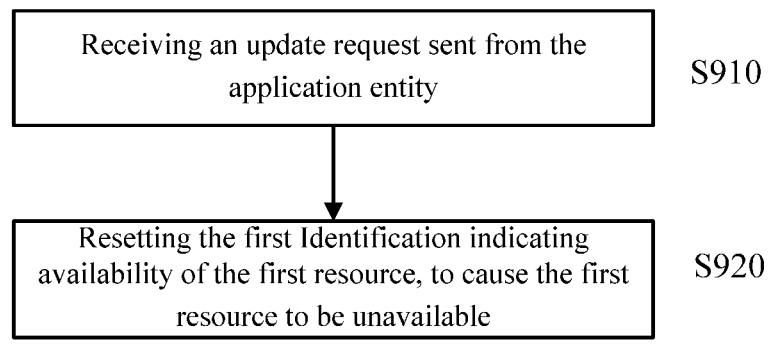
FIGS. 9 to 14 are a schematic flowchart of a method for creating a resource for an application entity according to an embodiment of the present disclosure each.

As illustrated in FIG. 9, according to an embodiment of the present disclosure, the method further comprises, upon it is detected that the application entity be switched from the second communication link back to the first communication link, at S910 receiving an update request sent from the application entity, and at S920 resetting the first attribute indicating availability of the first resource associated with the application entity based on this update request, to cause the first resource to be unavailable.

Figure 10:
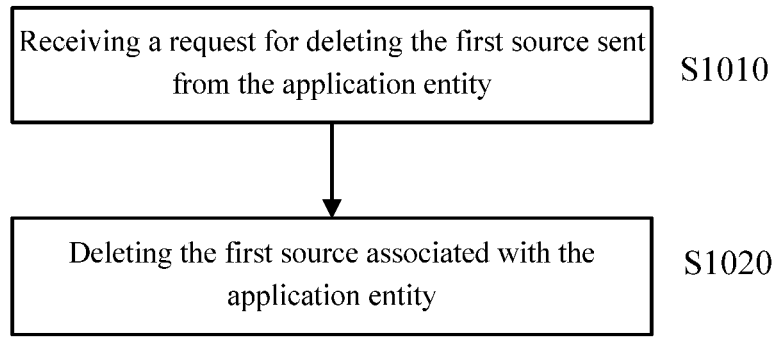

Optionally, according to an embodiment of the present disclosure, as illustrated in FIG. 10, the method further comprises: when the application entity be switched from the second communication link back to the first communication link, at S1010 receiving a request for deleting the first source sent from the application entity, and at S1020 deleting the first source associated with the application entity based on this request.

Figure 11:
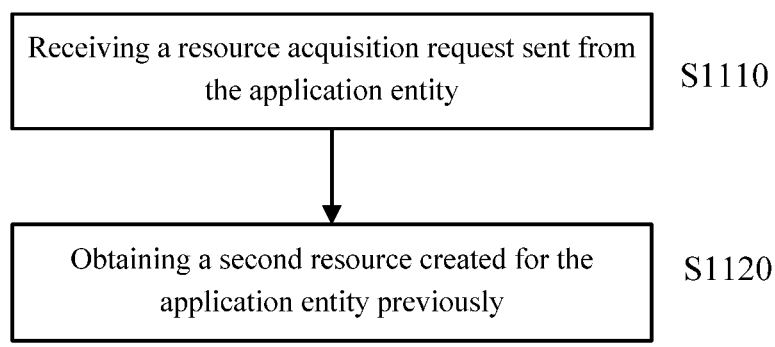

Optionally, according to an embodiment of the present disclosure, as illustrated in FIG. 11, the method further comprises: before receiving the registration request sent from the application entity, at S1110, receiving a resource acquisition request sent from the application entity; at S1120 obtaining a second resource created for the application entity previously according to the identification included in the resource acquisition request.

Figure 12:
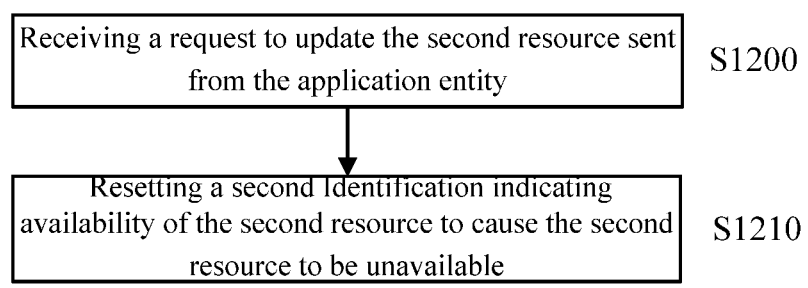

Optionally, according to an embodiment of the present disclosure, as illustrated in FIG. 12, the method further comprises: after acquiring the second resource created for the application entity previously, at S1200 receiving a request to update the second resource sent from the application entity, and at S1210 resetting a second attribute indicating availability of the second resource to cause the second resource to be unavailable.

Figure 13:
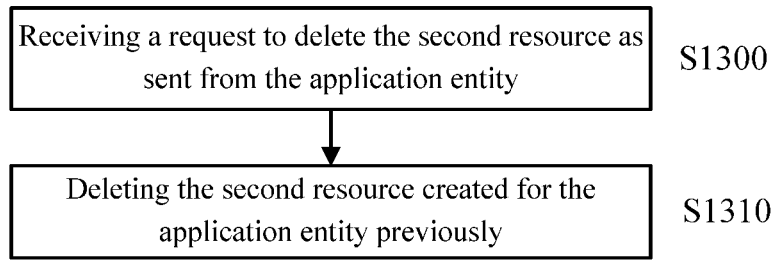

Optionally, according to an embodiment of the present disclosure, as illustrated in FIG. 13, the method further comprises: after acquiring the second resource created for the application entity previously, at S1300 receiving a request to delete the second resource as sent from the application entity, and at S1310 deleting the second resource created for the application entity previously according to this request.

Figure 14:
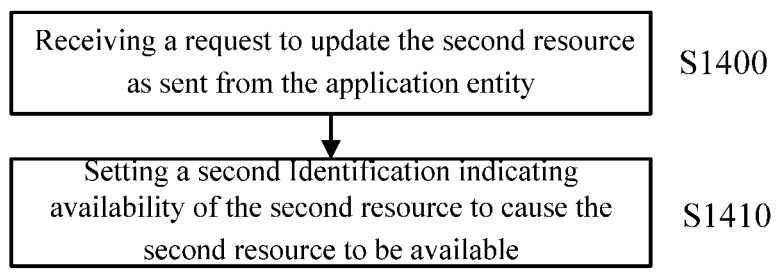

Optionally, according to an embodiment of the present disclosure, as illustrated in FIG. 14, the method further comprises: when the application entity be switched from the second communication link back to the first communication link, at S1400 receiving a request to update the second resource as sent from the application entity, and at S1410 setting a second attribute indicating availability of the second resource according to this request to cause the second resource to be available.

Optionally, the identification corresponding to the second resource is specified by the application entity or automatically assigned for the application entity.

Optionally, the identification corresponding to the second resource is globally unique or locally unique.

Figure 15:
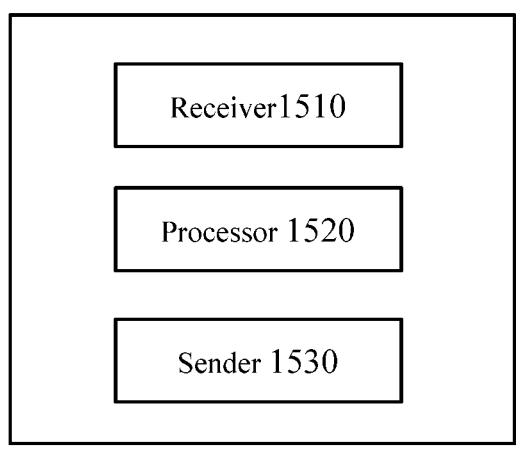
FIG. 15 is a schematic block diagram of a communication node device according to an embodiment of the present disclosure.

FIG. 15 is a schematic block diagram of a communication node device according to an embodiment of the present disclosure. As illustrated in FIG. 15, the communication node device comprises a receiver 1510 for receiving a registration request sent from an application entity communicating with the communication node device on a second communication link when the application entity is switched from a first communication link to the second communication link; a processor 1520 for creating a first resource according to the registration request, assigning an identification corresponding to the first resource to the application entity to associate the application entity with the first resource; and a sender 1530 for sending a response indicating the completion of the resource creation to the application entity.

Optionally, the communication node device can also have a built-in memory or an external memory for storing resources created for the application entity.

Figure 16:
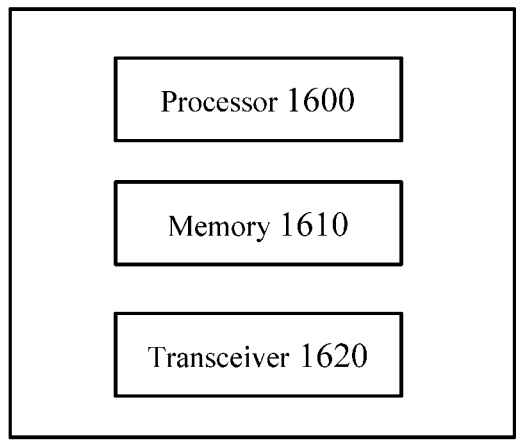
FIG. 16 illustrates a schematic block diagram of a communication node device according to another embodiment of the present disclosure.

FIG. 16 illustrates a schematic block diagram of a communication node device according to another embodiment of the present disclosure. As illustrated in FIG. 16, the communication node device comprises a processor 1600, a memory 1610 connected to the processor, and a transceiver, wherein the memory stores instructions, the processor is configured to execute the following steps when running the instructions stored in the memory: instructing the transceiver to receive, on the second communication link, a registration request sent from the application entity when the application entity is switched from a first communication link to a second communication link; creating, by the processor, a first resource according to the registration request; and assigning an identification corresponding to the first resource to the application entity so as to associate the application entity with the first resource.

Figure 17:
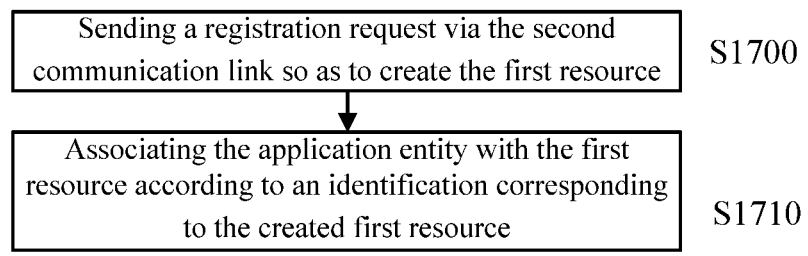
FIG. 17 illustrates a method for registration of an application entity according to an embodiment of the present disclosure.

FIG. 17 illustrates a method for registration of an application entity according to an embodiment of the present disclosure. As illustrated in FIG. 17, when the application entity is switched from a first communication link to a second communication link, S1700 a registration request is sent via the second communication link so as to create the first resource; S1710 the application entity is associated with the first resource according to an identification corresponding to the first resource as created.

Optionally, the first resource comprises a first attribute indicating availability of the first resource associated with the application entity, and the first attribute is set at the time of creating the first resource to indicate that the first resource is available.

Optionally, according to this method, when the application entity is switched from the second communication link back to the first communication link, a request to reset the first attribute is sent to cause the first resource to be unavailable.

Optionally, according to this method, when the application entity is switched from the second communication link back to the first communication link, a request to delete the first resource associated with the application entity is sent.

Optionally, according to this method, prior to sending the registration request, the method further comprises sending a resource acquisition request, so as to acquire the second resource created for the application entity previously.

Optionally, the method further comprises, after acquiring the second resource, further sending a request for resetting a second attribute indicating availability of the second resource to cause the second resource to be unavailable.

Optionally, when the application entity is switched from the second communication link back to the first communication link, the method further comprises sending a request for setting a second attribute indicating availability of the second resource to cause the second resource to be available.

Optionally, after acquiring the second resource, the method further comprises sending a request to delete the second resource.

Figure 18:
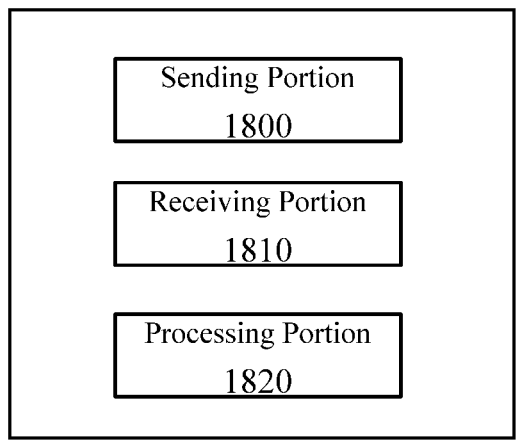
FIG. 18 is a schematic block diagram of a terminal device according to an embodiment of the present disclosure.

FIG. 18 is a schematic block diagram of a terminal device according to an embodiment of the present disclosure. As illustrated in FIG. 18, the terminal device comprises: a sending portion 1800 for, when an application entity running on the terminal device is switched from a first communication link to a second communication link, sending a registration request to a communication node device via the second communication link so as to create a first resource; a receiving portion 1810 for receiving a response indicating the completion of the resource creation as sent from the communication node device; and a processing portion 1820 for associating the application entity with the first resource according to an identification corresponding to the created first resource.

Figure 19:
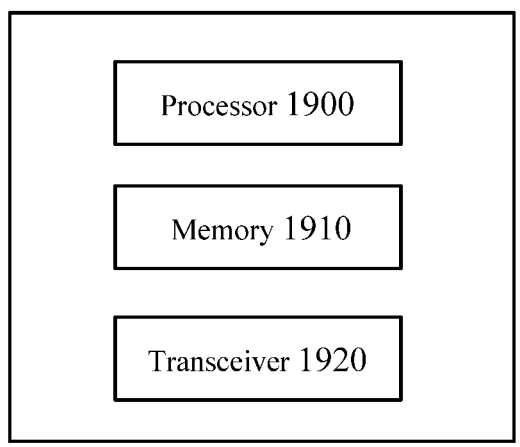
FIG. 19 illustrates a schematic block diagram of a terminal device according to another embodiment of the present disclosure.

FIG. 19 illustrates a schematic block diagram of a terminal device according to another embodiment of the present disclosure. As illustrated in FIG. 19, the terminal device comprises a processor 1900, a memory 1910 connected to the processor, and a transceiver 1920, wherein the memory stores instructions, the processor is configured to execute the following steps when running the instructions stored in the memory: when an application entity is switched from a first communication link to a second communication link, instructing the transceiver to send a registration request via the second communication link so as to create a first source; associating the application entity with the first resource according to an identification corresponding to the created first resource.

In the methods and devices provided in the embodiments of the present disclosure, when the communication link is switched, the terminal device can be re-registered with the communication node, which avoids communication service interruption due to the situation in which the terminal device cannot be re-registered with the communication node when the communication link is switched under the oneM2M protocol, and thereby ensures continuity and reliability of the communication service.

Thus it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which can be substantially represented in computer readable media and so executed by a computer or processor, whether or not such computer or processor is explicitly illustrated. The written computer readable medium and codes can be implemented in a transient state (signal) and a non-transient state (e.g., on a tangible medium such as a CD-ROM, DVD, Blu-ray, hard disk drive, flash memory card, or other type of tangible storage medium).

The functions of the various elements illustrated in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to referring exclusively to hardware capable of executing software, and can implicitly include, without limitation, digital signal processor ("DSP") hardware, read only memory ("ROM"), random access memory ("RAM"), and nonvolatile storage for storing software.

Other hardware, conventional and/or custom, can also be included. Similarly, any switches illustrated in the figures are conceptual only. Their function can be carried out through the operation of program logic, through dedicated logic, through the interaction of program control and dedicated logic, or even manually, the particular technique being selectable by the implementer as more specifically understood from the context.

Although the embodiment which incorporates the teachings of the present disclosure has been illustrated and described in detail herein, those skilled in the art can readily devise many other varied embodiments that still incorporate these teachings. It is noted that modifications and variations can be made by persons skilled in the art in light of the above teachings.

Some specific embodiments have been described above. But it should be understood that modifications can be made to these embodiments. For example, elements of different embodiments can be combined, supplemented, modified, and deleted to obtain other embodiments. In addition, it will be understood by those of ordinary skill in the art that other structures and processes can be used in place of the structures and processes that have been disclosed above to obtain resulting embodiments. The resulting embodiments at least achieve substantially the same function in substantially the same way, so as to achieve substantially the same effect provided by the embodiments disclosed in the present disclosure. Accordingly, these and other embodiments should be within the scope of the present disclosure.

The present application claims the priority of the Chinese Patent Application No. 201610265886.1 filed on Apr. 26, 2016, the entire disclosure of which is hereby incorporated in full text by reference as part of the present application.

What is claimed is:

1. A method for creating a resource for an application entity, comprising:
   receiving a registration request sent from the application entity when the application entity is switched from a first communication link to a second communication link;
   creating a resource according to the registration request as a first resource; and
   assigning an identification corresponding to the first resource to the application entity so as to associate the application entity with the first resource,
   wherein the first resource comprises an attribute indicating availability of the first resource associated with the application entity, which serves as a first attribute, and the value of the first attribute is set to indicate that the first resource is available or unavailable.

2. The method according to claim 1, wherein receiving the registration request sent from the application entity comprises: receiving, on the second communication link, the registration request sent from the application entity.

3. The method according to claim 1, wherein creating the first resource comprises setting the first attribute to indicate that the first resource is available; and
   wherein when the application entity is switched from the second communication link back to the first communication link,
   the first attribute is set to indicate that the first resource is unavailable.

4. The method according to claim 1, wherein when the application entity is switched from the second communication link back to the first communication link,
   the first resource associated with the application entity is deleted.

5. The method according to claim 1, wherein prior to receiving the registration request sent from the application entity, the method further comprises:
   receiving a resource acquisition request sent from the application entity, and acquiring a resource based on an identification corresponding to a resource created for the application entity included in the resource acquisition request as a second resource.

6. The method according to claim 5, further comprising:
   before the application entity is switched from the second communication link back to the first communication link, setting an attribute indicating availability of the second resource to cause the second resource to be unavailable.

7. The method according to claim 6, further comprising:
   when the application entity is switched from the second communication link back to the first communication link, setting an attribute indicating availability of the second resource to indicate that the second resource is available.

8. The method according to claim 5, further comprising: after acquiring the second resource, deleting the second resource.

9. The method according to claim 5, wherein the identification corresponding to the second resource is specified by the application entity or automatically assigned for the application entity; and wherein the identification corresponding to the second resource is globally unique or locally unique.

10. The method according to claim 1, wherein the registration request comprises a start identifier indicating to create the first resource for the application entity.

11. A communication node device for implementing the method of claim 1.

12. A method for registration of an application entity, comprising:
    sending a registration request to create a resource as a first resource when the application entity is switched from a first communication link to a second communication link; and
    associating the application entity with the first resource based on an identification corresponding to the created first resource,
    wherein the first resource comprises an attribute indicating availability of the first resource associated with the application entity, which serves as a first attribute, and the value of the first attribute is set to indicate that the first resource is available or unavailable.

13. The method according to claim 12, wherein sending the registration request comprises sending the registration request on the second communication link.

14. The method according to claim 12, wherein when the application entity is switched from the second communication link back to the first communication link,
    a request for resetting the first attribute is sent to cause the first resource to be unavailable.

15. The method according to claim 12, wherein when the application entity is switched from the second communication link back to the first communication link,
    a request for deleting the first resource associated with the application entity is sent.

16. The method according to claim 12, wherein prior to sending the registration request, the method further comprises sending a resource acquisition request to acquire a second resource created for the application entity;
    after acquiring the second resource, the method further comprises sending a request for resetting a second attribute indicating availability of the second resource to cause the second resource to be unavailable.

17. The method according to claim 16, wherein
    when the application entity is switched from the second communication link back to the first communication link, the method further comprises sending a request for setting the second attribute indicating availability of the second resource to cause the second resource to be available;
    after acquiring the second resource, the method further comprises sending a request to delete the second resource.

18. A terminal device for implementing the method of claim 12.

* * * * *